United States Patent [19]
Jones

[11] Patent Number: 5,924,513
[45] Date of Patent: Jul. 20, 1999

[54] TRAILER TIRE RETAINING RAIL

[76] Inventor: Allan E. Jones, Box 2495 Stn. B., Richmond Hill, Ontario, Canada, L4E 1A6

[21] Appl. No.: 09/026,417

[22] Filed: Feb. 19, 1998

[51] Int. Cl.$^6$ ................................................ B60R 21/00
[52] U.S. Cl. ......................... 180/271; 280/727; 280/762; 280/781; 293/126
[58] Field of Search ........................... 180/271; 293/126, 293/128, 1; 70/225; 280/781, 39, 40, 656, 727, 762, 768, 847, 851, 152.05, 250.1

[56] References Cited

U.S. PATENT DOCUMENTS 1,623,849  4/1927  Orrick .
5,823,586  10/1998  Marley ................................. 293/126

FOREIGN PATENT DOCUMENTS 76475   4/1983  European Pat. Off. ............... 280/656
184331  8/1922  United Kingdom ................... 280/847

*Primary Examiner*—Eric D. Culbreth

[57] ABSTRACT

A trailer tire retaining rail is provided including a trailer having an axle with at least one inflatable wheel rotatable mounted to each end thereof. A plurality of rail assemblies each have an outboard member mounted to the trailer adjacent to an outboard end of an associated wheel and an inboard member mounted to the trailer adjacent to an inboard end of an associated wheel.

9 Claims, 2 Drawing Sheets

TRAILER TIRE RETAINING RAIL

BACKGROUND OF THE INVENTION

1. Field of the Invention

The present invention relates to trailer fenders and more particularly pertains to a new trailer tire retaining rail for indicating to a driver that a tire of a trailer has been separated from the rim and further maintaining the separated tire about the axle of the trailer.

2. Description of the Prior Art

The use of trailer fenders is known in the prior art. More specifically, trailer fenders heretofore devised and utilized are known to consist basically of familiar, expected and obvious structural configurations, notwithstanding the myriad of designs encompassed by the crowded prior art which have been developed for the fulfillment of countless objectives and requirements.

Known prior art trailer fenders include U.S. Pat. No. 5,171,037; U.S. Pat. No. 4,973,082; U.S. Pat. No. 4,377,294; U.S. Pat. No. 320,592; U.S. Pat. No. 4,986,571; and U.S. Pat. No. 4,417,741.

In these respects, the trailer tire retaining rail according to the present invention substantially departs from the conventional concepts and designs of the prior art, and in so doing provides an apparatus primarily developed for the purpose of indicating to a driver that a tire of a trailer has been separated from the rim and further maintaining the separated tire about the axle of the trailer.

SUMMARY OF THE INVENTION

In view of the foregoing disadvantages inherent in the known types of trailer fenders now present in the prior art, the present invention provides a new trailer tire retaining rail construction wherein the same can be utilized for indicating to a driver that a tire of a trailer has been separated from the rim and further maintaining the separated tire about the axle of the trailer.

The general purpose of the present invention, which will be described subsequently in greater detail, is to provide a new trailer tire retaining rail apparatus and method which has many of the advantages of the trailer fenders mentioned heretofore and many novel features that result in a new trailer tire retaining rail which is not anticipated, rendered obvious, suggested, or even implied by any of the prior art trailer fenders, either alone or in any combination thereof.

To attain this, the present invention generally comprises a trailer having an axle with a pair of inflatable wheels rotatable mounted to each of opposite ends thereof. Next provided is a plurality of rail assemblies each including four planar members having an equal length. Each planar member further has a front surface, a rear surface, and periphery with a rectangular configuration. The periphery is defined by a long bottom edge, a long top edge and a pair of side edges formed therebetween. The members include an inboard member and an outboard member each with a pair of vertically spaced apertures. Such apertures are formed between the front and rear surface of the members adjacent to each end thereof, as shown in FIG. 4. As best shown in FIG. 2, the inboard member has a circular bore formed in a central extent thereof for being fixedly coupled to the axle in a horizontal orientation. In such orientation, the inboard member resides adjacent to the associated pair of tires such that the inboard member resides in perpendicular relationship with respect to the axle. The members further include a pair of side members each having a pair of threaded bores formed in each of the side edges thereof. The side members are situated between the ends of the inboard and outboard members such that each member is horizontally oriented. Together, the members form a square encompassing the associated pair of tires.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer tire retaining rail apparatus and method which has many of the advantages of the trailer fenders mentioned heretofore and many novel features that result in a new trailer tire retaining rail which is not anticipated, rendered obvious, suggested, or even implied by any of the prior art trailer fenders, either alone or in any combination thereof.

It is another object of the present invention to provide a new trailer tire retaining rail which may be easily and efficiently manufactured and marketed.

It is a further object of the present invention to provide a new trailer tire retaining rail which is of a durable and reliable construction.

An even further object of the present invention is to provide a new trailer tire retaining rail which is susceptible of a low cost of manufacture with regard to both materials and labor, and which accordingly is then susceptible of low prices of sale to the consuming public, thereby making such trailer tire retaining rail economically available to the buying public.

Still yet another object of the present invention is to provide a new trailer tire retaining rail which provides in the apparatuses and methods of the prior art some of the advantages thereof, while simultaneously overcoming some of the disadvantages normally associated therewith.

Still another object of the present invention is to provide a new trailer tire retaining rail for indicating to a driver that a tire of a trailer has been separated from the rim and further maintaining the separated tire about the axle of the trailer.

Even still another object of the present invention is to provide a new trailer tire retaining rail that includes a trailer having an axle with at least one inflatable wheel rotatable mounted to each end thereof. A plurality of rail assemblies each have an outboard member mounted to the trailer adjacent to an outboard end of an associated wheel and an inboard member mounted to the trailer adjacent to an inboard end of an associated wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
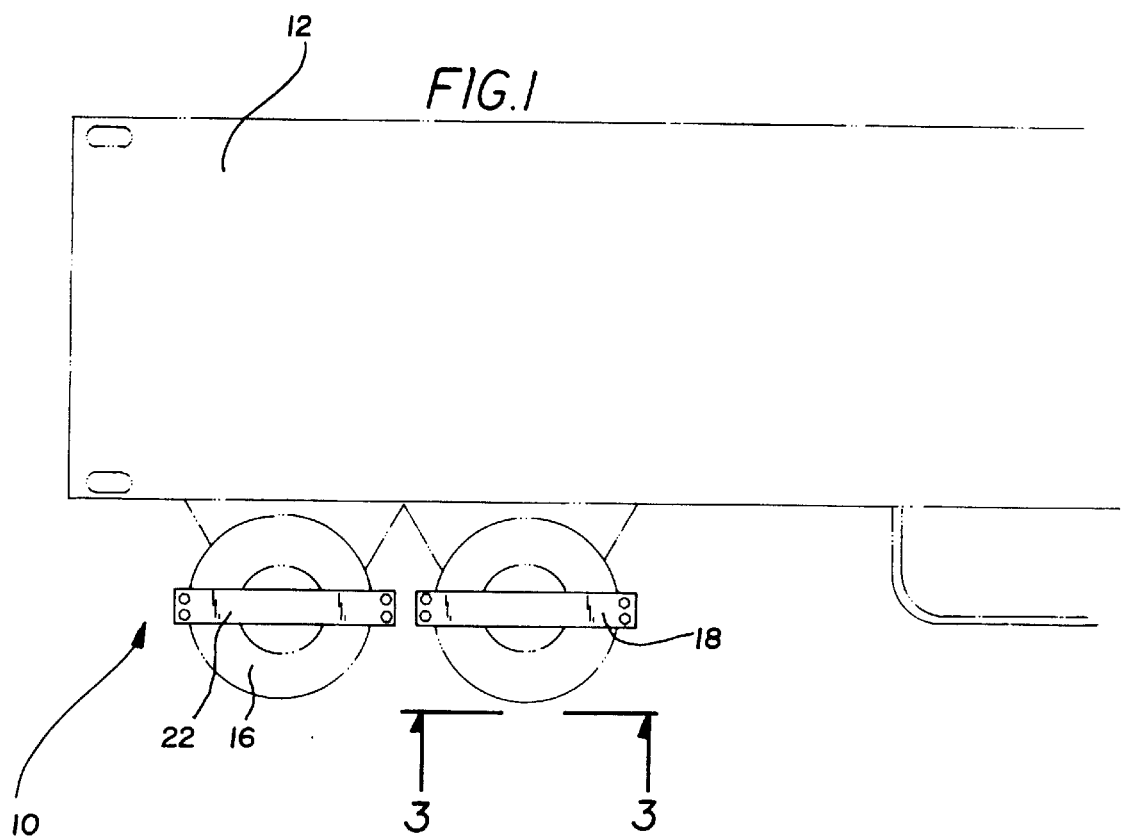
FIG. 1 is a side view of a new trailer tire retaining rail according to the present invention.

With reference now to the drawings, and in particular to FIGS. 1 through 4 thereof, a new trailer tire retaining rail embodying the principles and concepts of the present invention and generally designated by the reference numeral 10 will be described.

The present invention, as designated as numeral 10, includes a trailer 12 having an axle 14. Such axle is equipped with a pair of slightly spaced inflatable wheels 16 rotatable mounted to each end thereof.

Next provided is a plurality of rail assemblies each including four planar members 18 having an equal length. Each planar member further has a front surface, a rear surface, and a periphery with a rectangular configuration. The periphery is defined by a long bottom edge, a long top edge and a pair of side edges formed therebetween. The members include an inboard member 20 and an outboard member 22 each with a pair of vertically spaced apertures 24 formed therein. Such apertures are formed between the front and rear surface of the members adjacent to each end thereof, as shown in FIG. 4.

Figure 2:
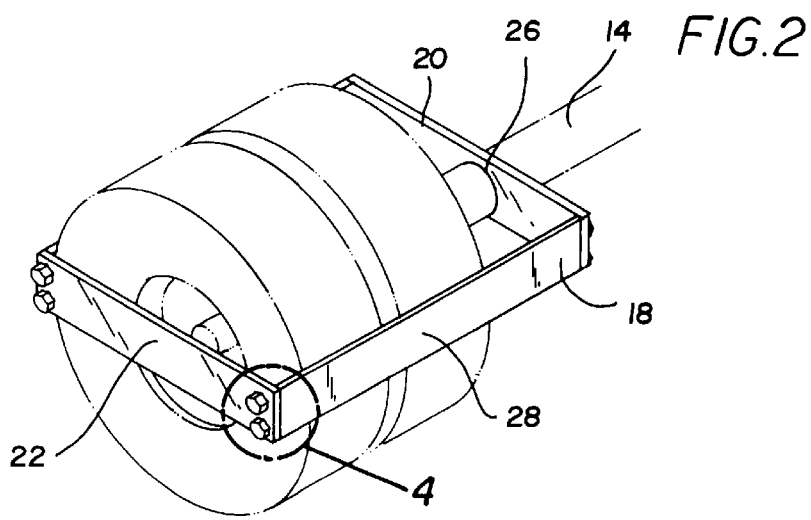
FIG. 2 is a perspective view of the present invention.
Figure 3:
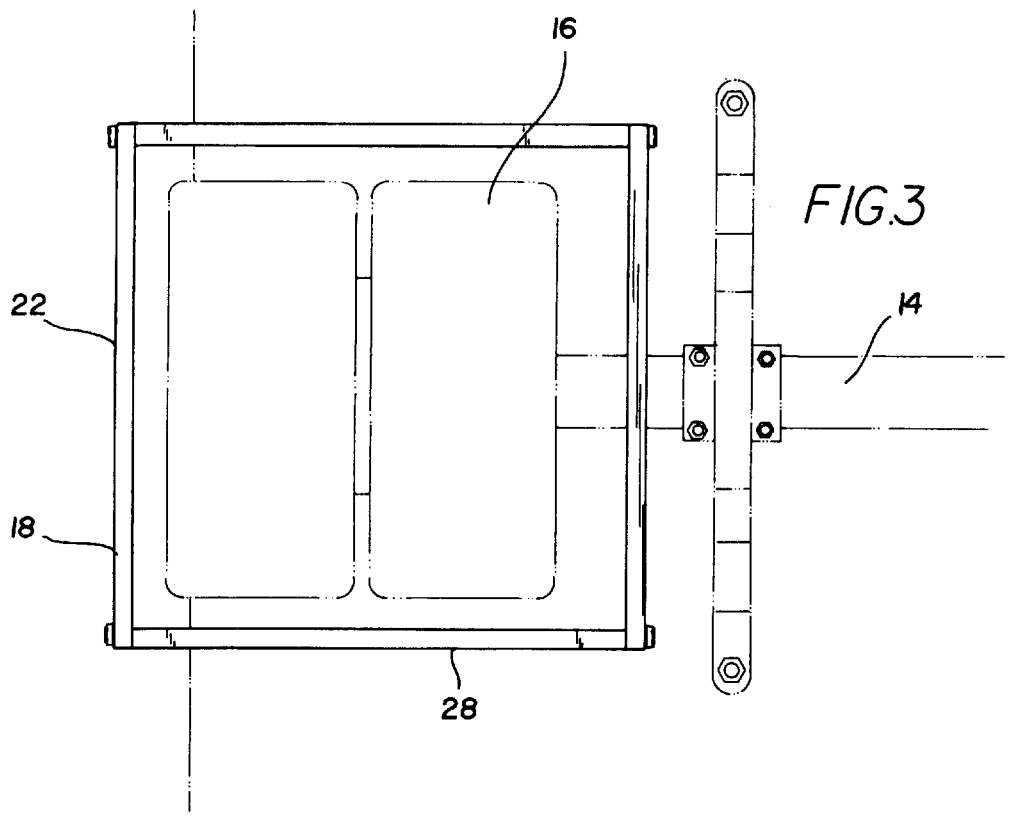
FIG. 3 is a bottom view of the present invention.

As best shown in FIG. 2, the inboard member has a circular bore 26 formed in a central extent thereof for being fixedly coupled to the axle in a horizontal orientation. Such fixed coupling may be accomplished by way of a weld or the like. In such orientation, the inboard member resides adjacent to the associated pair of tires such that the inboard member is maintained in perpendicular relationship with respect to the axle.

The members further include a pair of side members 28 each having a pair of threaded bores 30 formed in each of the side edges thereof. The side members are situated between the ends of the inboard and outboard members such that each member is horizontally oriented. Together, the members form a square encompassing the associated pair of tires. In the preferred embodiment, each of the members are spaced between about 1–2 inches from the tires.

Figure 4:
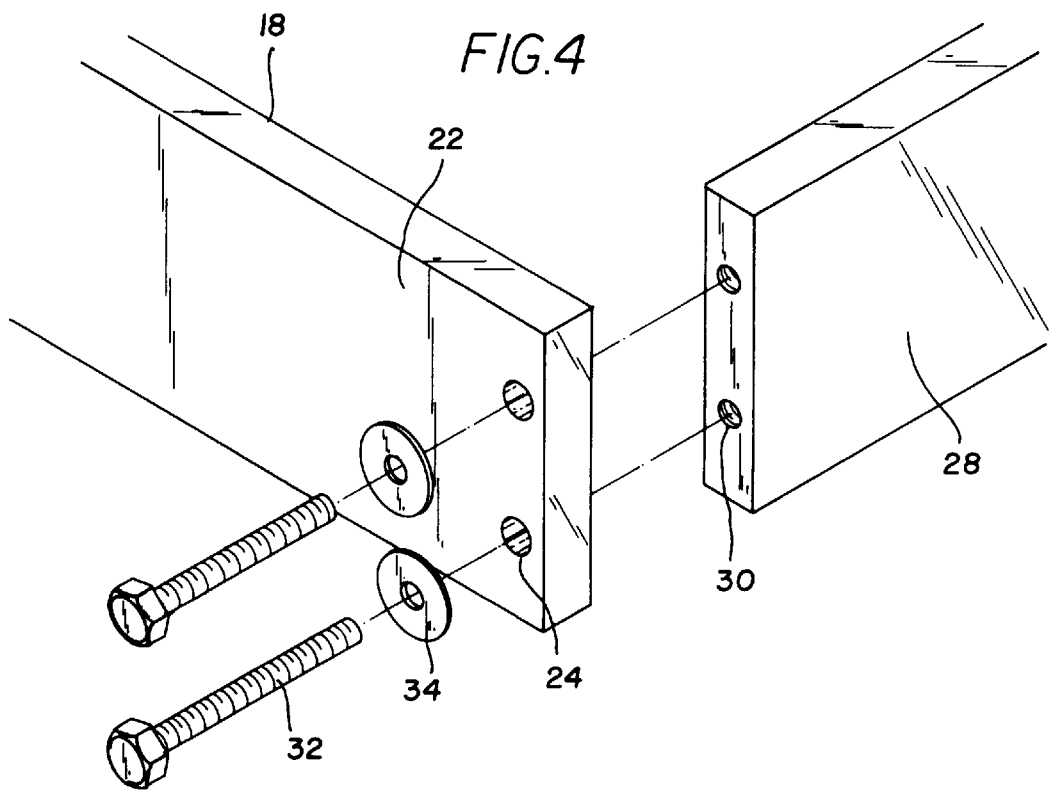
FIG. 4 is an exploded view of the present invention.

As shown in FIG. 4, a plurality of hex-bolts 32 are provided for being situated through the apertures of the outboard and inboard members and further screwably coupled to the threaded bores of the side members. The bolts thus function for maintaining the members in the operative orientation. As an option, washers 34 may be situated between the heads of the bolts and the outboard and inboard members.

During use, when an outer portion of a tire is removed from the rim, such tire abuts the side members thereby indicating to the driver of the condition of the tire. The inboard and outboard members then serve to preclude the closed loop outer portion of the tire from being removed from the axle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer tire retaining rail system comprising, in combination:

a trailer having an axle with a pair of inflatable wheels rotatable mounted to each of opposite ends thereof; and a plurality of rail assemblies each including four planar members each of an equal length and having a front surface, a rear surface, and a periphery with a rectangular configuration defined by a long bottom edge, a long top edge and a pair of side edges formed therebetween, the members including an inboard member and an outboard member each with a pair of vertically spaced apertures formed between the front and rear surface thereof adjacent to each end of the inboard and outboard members, the inboard member having a circular bore formed in a central extent thereof for being fixedly coupled to the axle in a horizontal orientation adjacent to the associated pair of wheels such that the inboard member resides in perpendicular relationship with respect to the axle, the members further including a pair of side members each having a pair of threaded bores formed in each of the side edges thereof, whereby the side members are situated between the ends of the inboard and outboard members such that each member is horizontally oriented and together form a square encompassing the associated pair of wheels;

a plurality of bolts for being situated through the apertures of the outboard and inboard members and further screwably coupled to the threaded bores of the side members for maintaining the members in the operative orientation.

2. A trailer tire retaining rail system comprising:

a trailer having an axle with at least one inflatable wheel rotatably mounted to each of opposite ends thereof; and a plurality of rail assemblies each including an outboard member mounted with respect to the trailer adjacent to an outboard end of an associated wheel and an inboard member mounted with respect to the trailer adjacent to an inboard end of an associated wheel;

wherein the plurality of rail assemblies each further include a pair of side members situated in front of and to the rear of each wheel;

wherein the outboard and inboard members form a square configuration.

3. The trailer tire retaining rail system as set forth in claim 2 wherein the outboard and inboard members reside at an elevation common with the axle.

4. The trailer tire retaining rail system as set forth in claim 2 wherein the outboard and inboard members are removably interconnected by way of bolts.

5. The trailer tire retaining rail system as set forth in claim 2 wherein the inboard member is fixedly mounted to the axle of the trailer.

6. A trailer tire retaining rail system adapted for use with a trailer having an axle with at least one inflatable wheel rotatably mounted to each of opposite ends thereof, the system comprising:

a plurality of rail assemblies each including an outboard member mounted with respect to the trailer adjacent to an outboard end of an associated wheel and an inboard member mounted with respect to the trailer adjacent to an inboard end of the associated wheel;

wherein the plurality of rail assemblies each further include a pair of side members situated in front of and to the rear of each wheel;

wherein the outboard and inboard members form a substantially square configuration.

7. The trailer tire retaining rail system as set forth in claim 6 wherein the outboard and inboard members reside at an elevation common with the axle.

8. The trailer tire retaining rail system as set forth in claim 6 wherein the outboard and inboard members are removably interconnected by way of bolts.

9. The trailer tire retaining rail system as set forth in claim 6 wherein the inboard member is fixedly mounted to the axle of the trailer.

* * * * *